United States Patent [19]
Kletecka et al.

[11] Patent Number: 4,797,438
[45] Date of Patent: Jan. 10, 1989

[54] STABILIZED GAMMA-IRRADIATED POLYPROPYLENE AND STERILIZABLE ARTICLES THEREOF

[75] Inventors: George Kletecka, Fairview Park; John T. Lai, Broadview Heights; Pyong-Nae Son, Akron, all of Ohio

[73] Assignee: The B. F. Goodrich Company, Akron, Ohio

[21] Appl. No.: 48,168

[22] Filed: May 11, 1987

[51] Int. Cl.$^4$ .............................................. C08K 5/34
[52] U.S. Cl. ........................................ 524/100; 522/75
[58] Field of Search ......................... 524/100; 522/75; 428/500

[56] References Cited

U.S. PATENT DOCUMENTS

| | | | |
|---|---|---|---|
| 4,190,571 | 2/1980 | Lai et al. | 524/100 |
| 4,455,401 | 6/1984 | Son et al. | 524/100 |
| 4,629,752 | 12/1986 | Layer et al. | 524/100 |
| 4,639,479 | 1/1987 | Lai et al. | 524/100 |
| 4,675,353 | 6/1987 | Son et al. | 524/100 |
| 4,692,487 | 9/1987 | Son et al. | 524/100 |

FOREIGN PATENT DOCUMENTS 0007736  6/1980  European Pat. Off. .
2043079  5/1974  United Kingdom .

OTHER PUBLICATIONS

Horng et al., "Stabilizers in Gamma–Irradiated Polypropylene", *Plastics Engineering*, Apr. 1984, pp. 35–37.
Niles et al., "Recent Developments in the Oxidative Degradation of Polypropylene by Gamma Radiation".

*Primary Examiner*—Kriellion Morgan
*Attorney, Agent, or Firm*—Alfred D. Lobo; Alan A. Csontos

[57] ABSTRACT

Excellent stabilization of polypropylene (PP) is obtained with a hindered amine containing a polysubstituted piperazin-2-one (PSP) moiety, for example, a $C_2$–$C_{12}$ alkylene connecting two PSP moieties, or a polyalkylene polyamine having pendant substituted oxo-piperazinyltriazine moieties (PIP-T), that is, having pendant triazine rings substituted with PSP substituents. The stabilizers are particularly effective for PP irradiated with high energy gamma-radiation. Irradiated articles made from PP stabilized with such a hindered amine have improved strength and discoloration resistance, compared to articles made from polymer stabilized with several other hindered amines tested, particularly the 2,2,6,6-tetramethyl-4-piperidyl sebacate.

9 Claims, No Drawings

STABILIZED GAMMA-IRRADIATED POLYPROPYLENE AND STERILIZABLE ARTICLES THEREOF

BACKGROUND OF THE INVENTION

The present invention relates to polypropylene (PP) and copolymers of propylene with a minor amount of a copolymerizable alpha-olefin monomer such as ethylene (P-co-E), individually and collectively referred to herein as "propylene polymer" for convenience "PP", which, upon exposure to gamma-radiation, develops very little objectionable color and maintains its physical properties without substantial degradation thereof. More particularly, the invention relates to articles before and after they are exposed to a preselected level of gamma-radiation.

Recent advances in PP technology have been instrumental in propagating use of the polymer for shaped articles for a wide variety of uses. The chemical inertness and lack of toxicity of PP, its low weight, and the relatively low cost of producing such articles of arbitrary size and shape, makes them peculiarly well-adapted for use in the medical or health maintenance field. Thus, PP is the material of choice for laboratory ware, including trays, funnels, Petri dishes and the like, and a variety of disposable articles including blow-molded IV-bottles, hypodermic syringes, needle shields, surgical gowns and the like. Such articles were routinely sterilized with ethylene oxide but its toxicity resulted in its gradual withdrawal as a sterilant. Ethylene oxide has been replaced by exposure to gamma radiation having an energy level in the range from about 0.5 to about 5 Mrad (megarads) for a short period of time, from about 1 minute to about 12 hours, the higher the intensity of radiation, the shorter the time required.

The problem is that PP degrades rapidly when so sterilized, developing an objectionable yellow color, and suffering a severe loss of physical integrity, the higher the intensity of radiation, the worse the degradation. The degradation, referred to as oxidative degradation, is particularly noticeable upon storage of a sterilized article at room temperature, the longer the storage period, the worse the degradation.

Considerable effort has been devoted, in the recent past, to the study of the details of the mechanisms and kinetics of the oxidation, with the expectation that such understanding will lead to the correct choice of an effective stabilizing additive (stabilizer) which will control the chemistry responsible for degradation. In an article titled "Recent Developments in the Oxidative Degradation of Polypropylene by Gamma Radiation" by Wiles, D. M. and Carlsson, D. J., theoretical equations are presented to explain the mechanisms and kinetics. They concluded that gamma radiation of PP results in theral oxidation which is qualitatively very similar to oxidation induced by other means, e.g. to photo-oxidation. The same reactive species are involved and although they will be distributed rather differently, the same oxidation products are formed.

The difference in the frequency of the wavelengths of uv light and gamma radiation, coupled with the great difference in their energy levels, makes their relative effects upon a polymer unpredictable. The differences go far deeper than the expected differences relating to their relative penetration into the polymer, as evidenced by the fact that some structurally similar compounds are far less effective stabilizers than others which appear to have all the necessary perquisites of the more effective stabilizers.

Notably, the effects of gamma radiation on PP are readily distinguishable over the effects of such radiation on other polymers (polystyrene "PS", say). PS has been found to be more stable (see "Stabilizers in gamma-irradiated polypropylene" by Horng, P. and Klemchuk, P., *Plastics Engineering* April '84, pp 35–37), as are several other polymers. They concluded that the high susceptibility to gamma-degradation decreed that the fate and effectiveness of stabilizers can only be assessed by determining whether they are being consumed in the irradiation process or being simply decomposed by gamma radiation. Further, they developed an experimental technique to evaluate the stability of four major genera of additives, namely an antioxidant (AO) such as tetrakis[methylene(3,5-di-tert-butyl-4-hydroxyhydrocinnamate)]methane, a hindered amine (HA) such as 2,2,6,6-tetramethyl-4-piperidyl sebacate, a phosphite such as tris(2,4-di-tert-butyl phenyl)-phosphite, and a thioester such as distearyl thiodipropionate. Their study indicated that the mechanical and molecular weight data confirmed that the residual AO or HA in the irradiated PP maintained the physical integrity of the samples by reacting with the propagating radicals and/or by decomposing peroxides. The phosphite and thioester additives were less effective because they behaved as secondary stabilizers and were completely consumed during radiation. But, they offered no basis for choosing an effective HA or AO, other than by repetitive trial and error.

Tests for color development in gamma-irradiated PP shows that HA alone did not cause significant discoloration and was the leading choice for medical end-products which were color or appearance-sensitive. Thus, HA was the best overall stabilizer for PP gamma-sterilizable products. Again, however, there is nothing to indicate how to choose the more effective among HAs, other than trial and error.

Yet, British Patent No. GB 2,043,079 discloses that PP was stabilized against gamma-radiation by incorporating a phenolic AO containing an isocyanurate group, preferably in conjunction with a thiosynergist and a stearate, clearly contradicting the foregoing conclusions.

We have now found further evidence that hindered amines with a specific structure, which amines exhibit excellent uv stabilization in numerous host polymers without notably distinguishing one polymer from another as far as their relative susceptibility to uv stabilization is concerned, are surprisingly effective to stabilize PP against degradation by gamma-radiation. Moreover, that these amines are more effective when used without an AO, phosphite or thioester.

The peculiarly distinguishing structural feature of such hindered amines is that they contain, as an essential portion of their basic structure, a polysubstituted (hereafter also referred to as "substituted" for brevity) piperazin-2-one (PSP) having an $N^1$-adjacent carbonyl, and at least the $C^3$ (carbon atom in the 3-position in the ring) has two substituents (hence "polysubstituted"), which may be cyclizable, that is, form a cyclic substituent.

Though such compounds, referred to in U.S. patents listed herebelow, were known to be excellent UV stabilizers in colorless organic materials when used in combination with antioxidants, there was nothing to suggest that their incorporation in PP, alone among other polymers tested, in the absence of an antioxidant, and preferably also in the absence of a phosphite or thioester stabilizer, would provide effective stabilization against gamma-radiation.

SUMMARY OF THE INVENTION

It has been discovered that a hindered amine containing a polysubstituted piperazin-2-one (PSP) moiety, for example, a $C_2$–$C_{12}$ alkylene connecting two PSP moieties, or a polyalkylene polyamine having pendant substituted oxopiperazinyl-triazine moieties (PIP-T), that is, having pendant triazine rings substituted with PSP substituents, is a highly effective stabilizer for propylene polymers ("PP") irradiated with high energy gamma-radiation; and, that irradiated articles made from PP stabilized with such a hindered amine have improved strength and discoloration resistance, compared to articles made from polymer stabilized with several other hindered amines tested, particularly the 2,2,6,6-tetramethyl-4-piperidyl sebacate.

It is therefore a general object of this invention to provide a method for imparting improved strength and discoloration resistance to a stabilized, gamma-irradiated PP article which comprises incorporating into said PP essentially free of an antioxidant, an effective amount of a hindered amine stabilizer containing a PSP moiety, said amount being sufficient to decelerate oxidative degradation of the PP.

It is a specific object of this invention to provide a method for sterilizing a shaped article made from PP, which method comprises, subjecting said shaped article to gamma radiation in an amount sufficient to sterilize the article; said PP being essentially free of an antioxidant, and having incorporated therein from 20 parts per million (ppm) to about 2.0%, preferably from 0.1% to 0.5%, based upon the weight of the PP in the article, of a hindered amine stabilizer selected from the group consisting of (i) a bis-compound consisting of a $C_2$–$C_{12}$ alkylene connecting two PSP moieties, and (ii) a polyalkylene polyamine having pendant triazine rings with PSP substituents.

It is another general object of this invention to provide a shaped article of manufacture of improved strength and discoloration resistance, shaped from PP essentially free from an antioxidant, the PP having incorporated therein as a stabilizer, an effective amount, sufficient to decelerate oxidative degradation of the PP, of a hindered amine stabilizer containing a PSP moiety, said shaped article having been subjected to a dose of gamma-radiation.

DETAILED DESCRIPTION OF PREFERRED EMBODIMENTS

In a particular embodiment, this invention provides an article of laboratory ware or medical ware, made from water-white propylene polymer, which article is sterilizable by gamma-radiation from a cobalt-60 source. Incorporated in the polymer, and preferably uniformly distributed therein, is a small amount, from about 20 ppm to about 2.0% by weight (based on the weight of all the polymer from which the article is formed), and more preferably from about 0.1 phr to about 0.5 phr, of a polysubstituted piperazinone (PSP). Details for preparation of numerous hindered amines containing a PSP moiety are disclosed in U.S. Pat. Nos. 4,167,512; 4,190,571; 4,207,228; 4,240,961; 4,246,412; 4,297,497; 4,292,240; 4,297,497; 4,415,684; 4,466,915; 4,480,092; 4,547,538; and 4,639,478; inter alia, the disclosures of which are incorporated by reference thereto as if fully set forth herein.

The PSP moiety is found in stabilizers which belong to a class of compounds comprising hindered amines, and their acid addition salts, in which the PSP moiety is represented as follows:

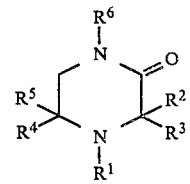

wherein, $R^1$ represents hydrogen, oxygen, $C_1$–$C_{18}$ alkyl, $C_1$–$C_6$ hydroxyalkyl, $C_2$–$C_{12}$ acyl, $C_3$–$C_8$ alkenyl, $C_3$–$C_8$ alkynyl, $C_7$–$C_{12}$ aralkyl which is unsubstituted or substituted in the alkyl moiety by hydroxyl, or $C_1$–$C_8$ alkanoyl or $C_3$–$C_5$ alkenoyl;

$R^2$, $R^3$, $R^4$ and $R^5$ independently represent hydrogen, $C_1$–$C_{24}$ alkyl, $C_1$–$C_{12}$ hydroxyalkyl, $C_1$–$C_{12}$ haloalkyl, $C_1$–$C_{12}$ cyanoalkyl, $C_2$–$C_{12}$ aminoalkyl or iminoalkyl, $C_3$–$C_{18}$ ether groups, $C_4$–$C_{18}$ hydroxyalkyl ether or cyanoalkyl ether groups, $C_7$–$C_{14}$ alkenyl or aralkyl, $C_2$–$C_7$ alkylene, and optionally containing a phosphite, ester, or hindered phenol group, and which in combination, one with another, represent $C_5$–$C_{14}$ cycloalkyl at least four of which C atoms are cyclized, and, optionally containing a keto, ester, amide, ether, thio or hydroxy group; but, only one of $R^2$ and $R^3$, and only one of $R^4$ and $R^5$ may be hydrogen; and, $R^6$ represents a free valency through which the PSP moiety is connected to the remaining structure of the stabilizer. When a PSP is not a substituent, $R^6$ typically represents H or $CH_3$.

Specific examples of such stabilizers containing a PSP moiety are identified by the following code numbers and structures in which $CH_2$ groups at the intersection of lines are not otherwise identified, and projecting lines represent $CH_3$ groups.

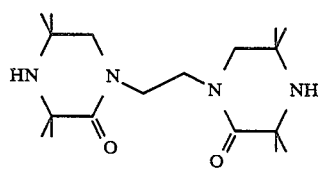

7963-347 (GR-3034)

-continued
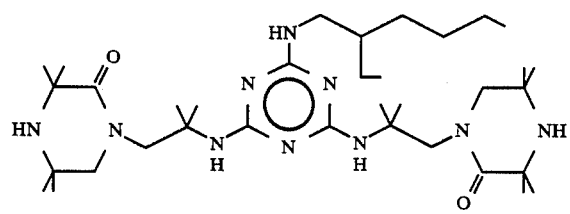
7956-796
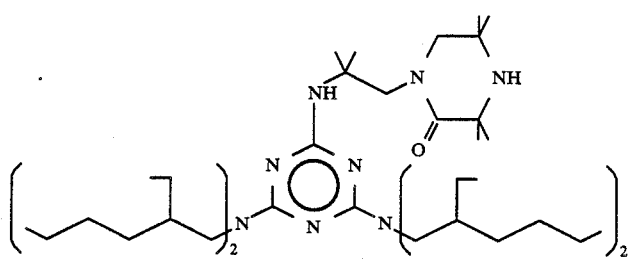
7956-548
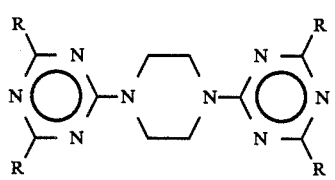
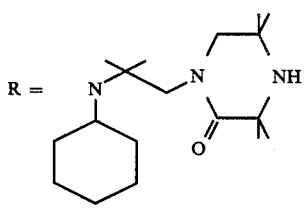
7957-722
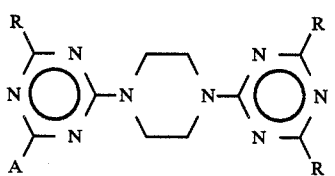
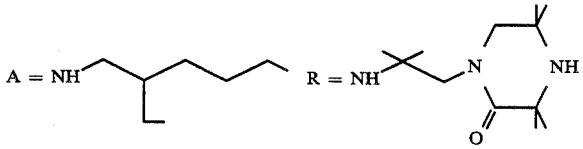
7956-678
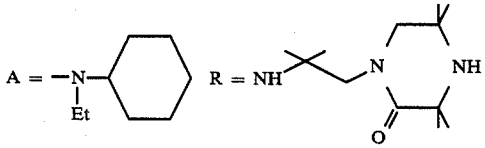
7956-670
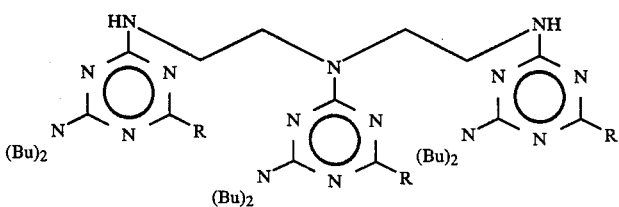

-continued
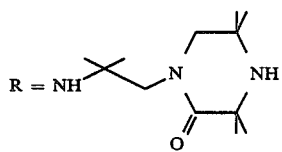
7956-518
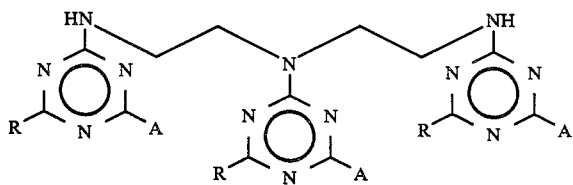
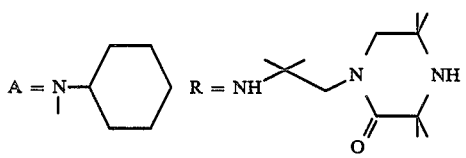
7956-524
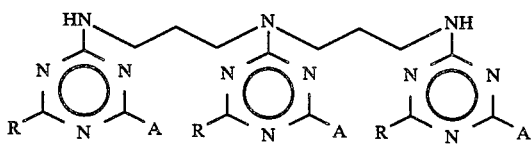
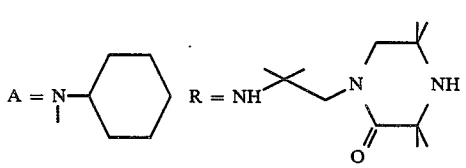
7956-580
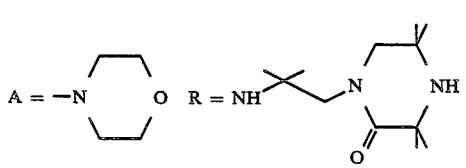
7956-586
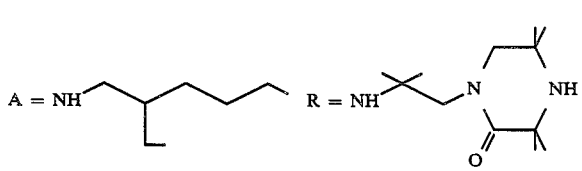
7956-602
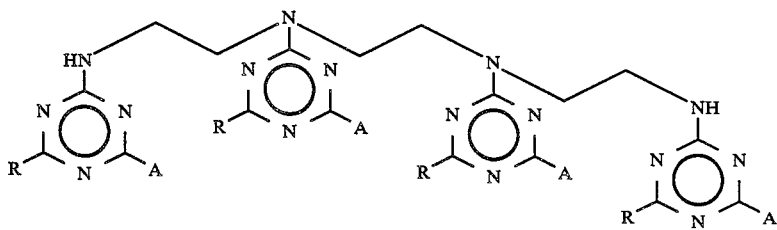
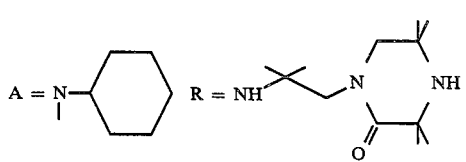
7956-608
The propylene polymer is typically polypropylene, but may be a random or block copolymer of propylene Though prior art stabilized polyolefins may include an impact modifier, there is no impact modifier in the stabilized propylene polymer used to thermoform our article. The use of impact modifiers help stabilize the propylene polymer by desensitizing it, but conventional impact modifiers, for example, ethylene-propylene-diene terpolymer rubber, styrene-butadiene-styrene block copolymers, and the like, are highly undesirable from the standpoint of color.

For the same reason, namely, the contribution of known antioxidants to color, our stabilized propylene polymer is free of an antioxidant, through prior art compositions utilize them to enhance stability to gamma-radiation.

Solely for the purpose of facilitating the injection molding, or other thermoforming operation, of the propylene polymer, a metal stearate such as calcium or zinc stearate in an amount insufficient to deleteriously affect the color of the propylene polymer, preferably in the range from about 10 ppm to about 150 ppm, may be blended into the PP.

Since a predominant concern is color, it is most preferred that no pigment be added to the normally water white propylene polymer, However, if color is desired, for example, blue, a phthalocyanine pigment may be added in an amount sufficient to provide the desired color, but insufficient adversely to affect the stabilization provided by the PSP-containing stabilizer.

The PSP-containing stabilizer may readily be incorporated into the PP by any conventional technique at a convenient stage prior to the manufacture of shaped articles from the PP. For example, the stabilizer may be mixed with the PP in dry powder form, or a suspension or emulsion of the stabilizer may be mixed with a solution, suspension, or emulsion of the polymer.

Though the preferred stabilized PP has no antioxidant added to it and is essentially free of antioxidant, a small amount, less than about 50 ppm of AO, may not make a sufficient contribution towards color upon being irradiated, and is tolerable. Such a small amount of antioxidant may be present in commerically available antioxidant-free PP, added thereto for the purpose of facilitating its manufacture. Additives other than an antioxidant, may be added if they do not contribute to color or help degrade the physical properties of the PP. Such additives may include lubricants in addition to alkaline earth metal stearates, near-colorless or white fillers such as glass fibers or talc, and optional brighteners.

Articles of sterilizable propylene polymer must likely to benefit from sterilization by gamma-radiation, are the components of hypodermic syringes, catheters, cannulae and prosthetic devices, and self-supporting propylene polymer films from about 0.5 mil to about 2 mil thick used for packaging, and for making colostomy bags, and devices for coping with incontinence or post-urinary drip.

Discoloration (yellowing) is usually evident immediately after irradiation. Less evident is the degradation of physical properties which typically develop with time, particularly upon aging at room temperature or above. Most reliable as a measure of the extent of degradation is the yield-work parameter which is the area under the stress-strain curve up to the yeild point. This reflects the useful amount of elongation inherent in the sample.

A sample tensile bar (dumbbell) is mounted in the jaws of an Instron tester and tested as set forth in ASTM D-638. The tensile bars were drawn at an Instron crosshead speed of 2"/min using a jaw separation of 1". The Instron is operatively connected to a computer programmed to use the data from the test to generate a stress-strain curve. From the stress-strain curve for each sample, the computer calculates the break percent elongation by the formula set forth in D-638, and, "yield-work" the measure of which is the area under the curve up to the yield point.

Yield-work is found to be a useful measure of the amount of physical strength left in the specimen, and thus the level of stability imparted by the various stabilizers. The calculated values for break % elongation and yield work for each specimen are tabulated in Tables 1 and 2, herebelow. These values are for PP samples containing 0.2 phr and 0.1 phr of stabilizer, respectively, which were exposed to a dosage rate of about 0.5 Mrad/hr until they received 3.5 Mrad of gamma-radiation. The values are not calculated for the samples reported in Table 3 because the specimens snapped without elongating.

A typical PP used is Profax 6301 (melt flow index 12) powder to which was added the desired amount of stabilizer and about 0.10 phr calcium stearate (0.1 parts per 100 parts of PP) before mixing in a Waring blender to yield a powder-mixed concentrate. The concentrate is then diluted with additional PP and mixed to the desired concentration in a Henschel high speed powder mixer. The diluted blend is extruded at 215° C. through a rod die and pelletized. The pelletized compounds were injection molded into 3"×0.5"×0.045" tensile bars.

An alternative is to dissolve the stabilizer in a suitable solvent such as methylene chloride, then solvent-blend the PP powder. After removal of the solvent by evaporation under reduced pressure, the stabilized PP formulation is extruded and pelleted before it is formed into tensile bars. In either event, the conditions of extrusion of the rods, and the subsequent injection molding of the tensile bars, such as internal pressure and temperature are maintained the same for all samples. The tensile bars are injection molded in a Wasp #45 Newbury Mini-Jector at an internal pressure of about 400 psi and a temperature of 500° F., which is just sufficient to give a complete fill of the die, and these conditions are maintained the same for all samples.

The control bars, and the bars of the stabilized blends were then irradiated at the rate of 0.65 Mrad/hr for 10 hr (for the samples reported in the Tables), or some other predetermined irradiation rate and period of time. The irradiated bars are then aged at room temperature, or an elevated temperature, for example, in a forced air oven at 60° C. The samples used in the tests in the Tables were aged at room temperature (20° C.). Stress-strain properties and color were monitored at intervals of time for a period of six months. Color (yellowness index, by ASTM test D-1225) was measured with a MacBeth Mc1010 colorimeter.

In an analogous manner, it has been found that a hindered amine containing a PSP moiety may also be used to stabilize ultra-high molecular weight polyethylene to be sterilized for medical applications, currently being developed, as reported in "Irradiation of Ultra-High Molecular Weight Polyethylene" by R. Salovey and A. Shinde, *Polym. Preprints,* 26, No. 1, April 1985, pg 118-9, and in an article by E. S. Grood, R. Shastri and C. N. Hopson in *J. Biomed. Mat. Res.* 16, 399 (1982).

The following examples serve to illustrate the invention.

Numerous tensile bars were prepared from Profax 6301 powder-blend with Ca-stearate and two concentrations (0.1 phr and 0.2 phr) of numerous PSP-containing stabilizers including GR-3034 (identified herein as 7963-347 and commercially available from The B. F. Goodrich Company) without any added AO. The tensile bars were molded in a mold kept at a constant 60° C. to prevent thermal shock of the injection-molded mass. The uniformly high break percent elongation (about 500%) obtained before irradiation of the bars is evidence of a morphology induced by slow cooling.

The bars were then irradiated at 3.5 Mrad for 10 hr and aged at room temperature (20° C.) for 2 months. Some bars were irradiated at 5 Mrad for 10 hr and aged 2 months at room temp. The PP used in all these tests showed a crystallinity of 37.4% by DSC. From this crystallinity, the amorphous fraction is found, and it was calculated by known equations that 3.2 Mrad was close to the critical dose for Profax 6301. A dose greater than the critical dose causes the break elongation to drop precipitously, indicating total degradation. The effect of a 5 Mrad dose on color after aging for 2 months at 60° C., is tabulated in Table 3. It is evident from the data in Table 3 that, despite the high radiation dosage, there is little color development.

The yellowness index (YI) for each bar is measured before and after irradiation, as is the break elongation, both of which are set forth in Tables 1 and 2. A YI below 10 indicates that the tensile bar is essentially water-white, progressively showing more color as the number increases. A YI of 11 is barely yellow to the naked eye only when compared to a water-white specimen. The absolute yellowness as indicated by the YI is generally not of as great concern as the propensity of the YI to change. The absolute YI itself will depend upon such things as thickness of the material, the presence of other additives, the variation in wavelength of the light source, and the like.

As will be evident from the data in Table 2, the stabilizers used at one-half the concentration of those used in Table 1 gave comparable stabilization. The tensile bar containing 7963-347 in each of the concentrations showed no significant difference in stabilization for 0.1 phr and 0.2 phr. From Table 3 it is evident that several samples show very little color even after exposure to 5 Mrad, though they could not be elongated much.

It is evident that 7963-347 (GR-3034) (a) shows less color development in all formulations without an AO; and, (b) preserves physical properties of the PP more effectively than does Tinuvin 770. Though it is not apparent from the relative yield-work values, or the brake % elongations at room temperature, aging at 60° C. caused bars made with the 770 to fail (tensile), while the bars containing 7963-347 (GR-3034) remained intact.

It will also be evident that the amount of stabilizer to be incorporated into the PP should be sufficient to attenate the oxidative degradation of the polymer irrespective of the particular source of such degradation. An article subjected to btoh gamma- and ultraviolet light-radiation will tend to be oxidatively degraded by both so that the amount of stabilizer used should be greater than that used to attenuate its degradation due to only one of those sources.

As already pointed out, PP tends to disintegrate when the total dosage of gamma-radiation exceeds about 5 Mrad. For sterilization of the articles, a total dosage in the range from about 0.5 to 5 Mrad, more preferablyu from about 1.5 to 3 Mrad, is generally delivered and accumulated by the articles over a period of from about 1 minute to about 12 hr, the most preferred rate being about 0.5 Mrad/hr.

It should be noted that, because the values calculated for yield-work are subject to an experimental error of ±10%, the data show that there is very little yield-work percent change before and after irradiation, though the change in break % elongation appears to be relatively large.

TABLE 1

3.5 MRAD, 0.2 PHR LEVEL, 2 MONTHS AT ROOM TEMPERATURE

| IDENTIF. | YELLOWNESS INDEX | | BREAK % ELONG. | | YIELD WORK | |
| --- | --- | --- | --- | --- | --- | --- |
| | PRE-RAD | POST-RAD* | PRE-RAD | POST-RAD | PRE-RAD | POST-RAD |
| 7956-518 | 9.0 | 10.6 | 605 | 272 | 33.7 | 34.9 |
| 7956-548 | 9.0 | 11.6 | 566 | 164 | 36.0 | 36.6 |
| 7956-586 | 10.3 | 11.4 | 588 | 229 | 37.9 | 36.0 |
| 7956-602 | 9.9 | 10.8 | 524 | 213 | 36.2 | 37.0 |
| 7956-670 | 9.9 | 11.1 | 563 | 163 | 38.9 | 36.0 |
| 7956-678 | 9.6 | 11.0 | 583 | 155 | 37.2 | 36.0 |
| 7957-722 | 9.5 | 11.3 | 539 | 230 | 37.6 | 38.1 |
| 7963-347 | 9.3 | 10.7 | 461 | 145 | 37.0 | 36.9 |
| Tinuvin 770 | 9.2 | 11.7 | 464 | 181 | 34.4 | 35.5 |

*MEASURED AT 60 DEG. C. AFTER 2 MONTHS

TABLE 2

3.5 MRAD, 0.1 PHR LEVEL, 2 MONTHS AT ROOM TEMPERATURE

| IDENTIF. | YELLOWNESS INDEX | | BREAK % ELONG. | | YIELD WORK | |
| --- | --- | --- | --- | --- | --- | --- |
| | PRE-RAD | POST-RAD* | PRE-RAD | POST-RAD | PRE-RAD | POST-RAD |
| 7956-524 | 9.5 | 10.5 | 572 | 248 | 37.3 | 37.0 |
| 7956-580 | 9.5 | 10.9 | 496 | 272 | 36.9 | 35.5 |
| 7956-608 | 10.1 | 11.0 | 475 | 155 | 36.0 | 37.8 |
| 7956-796 | 9.5 | 11.2 | 505 | 329 | 40.0 | 37.3 |
| 7963-347 | 9.8 | 10.9 | 438 | 177 | 35.2 | 37.4 |
| Tinuvin 770 | 9.5 | 11.8 | 471 | 145 | 34.8 | 38.5 |

*MEASURED AT 60 DEG. C. AFTER 2 MONTHS

TABLE 3

5.0 MRAD, 0.2 PHR LEVEL, 2 MONTHS AT 60 DEG. C.

| IDENTIF. | YELLOWNESS INDEX | |
| --- | --- | --- |
| | PRE-RAD | POST-RAD |
| 7956-518 | 9.0 | 10.6 |
| 7956-548 | 9.0 | 11.6 |
| 7956-586 | 10.3 | 11.4 |
| 7956-602 | 9.9 | 10.8 |
| 7956-608 | 9.5 | 10.9 |
| 7956-670 | 9.9 | 11.1 |
| 7956-678 | 9.6 | 11.0 |
| 7957-722 | 9.5 | 11.3 |
| 7963-347 | 9.3 | 10.7 |
| Tinuvin 770 | 9.2 | 12.1 |

We claim:

1. A method for imparting improved strength and discoloration resistance to a stabilized, gamma-irradiated polypropylene polymer article which comprises incorporating into said polypropylene polymer, which is essentially free of an antioxidant, an effective amount from 20 ppm to 2% of a hindered amine stabilizer containing a polysubstituted piperazin-2-one (PSP) moiety having the structure

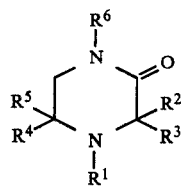

wherein,

R[1] represents hydrogen, oxygen, $C_1$–$C_{18}$ alkyl, $C_1$–$C_6$ hydroxyalkyl, $C_2$–$C_{12}$ acyl, $C_3$–$C_8$ alkenyl, $C_3$–$C_8$ alkynyl, $C_7$–$C_{12}$ aralkyl which is unsubstituted or substituted in the alkyl moiety by hydroxyl, or $C_1$–$C_8$ alkanoyl or $C_3$–$C_5$ alkenoyl;

R[2], R[3], R[4] and R[5] independently represent hydrogen, $C_1$–$C_{24}$ alkyl, $C_1$–$C_{12}$ hydroxyalkyl, $C_1$–$C_{12}$ haloalkyl, $C_1$cyanoalkyl, $C_2$–$C_{12}$ aminoalkyl or iminoalkyl, $C_3$–$C_{18}$ ether groups, $C_4$–$C_{18}$ hydroxyalkyl ether or cyanoalkyl ether groups, $C_7$–$C_{14}$ alkenyl or aralkyl, $C_2$–$C_7$ alkylene, and optionally containing a phosphite, ester, or hindered phenol group, and which in combination, one with another, represent $C_5$–$C_{14}$ cycloalkyl at least four of which C atoms are cyclized, and, optionally containing a keto, ester, amide, ether, thio or hydroxy groups; but, only one of R[2] and R[3], and only one of R[4] and R[5] may be hydrogen; and, R[6] represents a free valency through which the PSP moiety is connected to the remaining structure of the stabilizer;

said hindered amine stabilizer being selected from the group consisting of (i) a bis-compound consisting of a $C_2$–$C_{12}$ alkylene connecting two PSP moieties, and (ii) a polyalkylene polyamine having a pendant triazine ring with a PSP substituent;

said effective amount being sufficient to attenuate oxidative degradation of said polypropylene polymer.

2. The method of claim 1 wherein said hindered amine stabilizer is a polyalkylene polyamine having pendant triazine rings with PSP substituents on each of the rings.

3. The method of claim 2 wherein the total dosage of said gamma-radiation is in the range of from about 0.5 to 5.0 Mrad accumulated over a period of from about 1 minute to about 12 hours.

4. A method for sterilizing a shaped article made from polypropylene polymer, which method comprises, subjecting said shaped article to gamma radiation in an amount sufficient to sterilize the article; said polypropylene polymer being essentially free of an antioxidant, and having incorporated therein from 20 parts per million (ppm) to about 2.0%, based upon the weight of the propylene polymer in the article, of a hindered amine stabilizer containing a polysubstituted piperazin-2-one (PSP) moiety having the structure

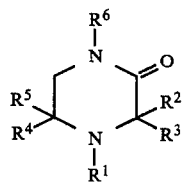

wherein,

R[1] represents hydrogen, oxygen, $C_1$–$C_{18}$ alkyl, $C_1$–$C_6$ hydroxyalkyl, $C_2$–$C_{12}$ acyl, $C_3$–$C_8$ alkenyl, $C_3$–$C_8$ alkynyl, $C_7$–$C_{12}$ aralkyl which is unsubstituted or substituted in the alkyl moiety by hydroxyl, or $C_1$–$C_8$ alkanoyl or $C_3$–$C_5$ alkenoyl;

R[2], R[3], R[4] and R[5] independently represent hydrogen, $C_1$–$C_{24}$ alkyl, $C_1$–$C_{12}$ hydroxyalkyl, $C_1$–$C_{12}$ haloalkyl, $C_1$–$C_{12}$ cyanoalkyl, $C_2$–$C_{12}$ aminoalkyl or iminoalkyl, $C_3$–$C_{18}$ ether groups, $C_4$–$C_{18}$ hydroxyalkyl ether or cyanoalkyl ether groups, $C_7$–$C_{14}$ alkenyl or aralkyl, $C_2$–$C_7$ alkylene, and optionally containing a phosphite, ester, or hindered phenol group, and which in combination, one with another, represent $C_5$–$C_{14}$ cycloalkyl at least four of which C atoms are cyclized, and, optionally containing a keto, ester, amide, ether, thio or hydroxy group; but, only one of R[2] and R[3], and only one of R[4] and R[5] may be hydrogen; and, R[6] represents a free valency through which the PSP moiety is connected to the reamining structure of the stabilizer;

said hindered amine stabilizer being selected from the group consisting of (i) a bis-compound consisting of a $C_2$–$C_{12}$ alkylene connecting two PSP moieties, and (ii) a polyalkylene polyamine having a pendant triazine ring with a PSP substituent.

5. The method of claim 4 wherein the total dosage of said gamma-radiation is in the range from about 0.5 to 5.0 Mrad accumulated over a period of from about 1 minute to about 12 hours.

6. The method of claim 5 wherein said hindered amine stabilizer is a polyalkylene polyamine having pendant triazine rings with a PSP substituent on each of the rings.

7. A shaped article of manufacture of improved strength and discoloration resistance, shaped from a propylene polymer essentially free from an antioxidant, said polymer having incorporated therein as a stabilizer, an effective amount from 20 ppm to 2%, sufficient to attenuate oxidative degradation of the polymer, of a hindered amine stabilizer containing a polysubstituted piperazin-2-one (PSP) moiety having the structure

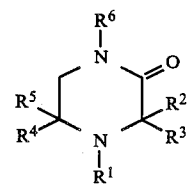

wherein,

R[1] represents hydrogen, oxygen, $C_1$–$C_{18}$ alkyl, $C_1$–$C_6$ hydroxyalkyl, $C_2$–$C_{12}$ acyl, $C_3$–$C_8$ alkenyl, $C_3$–$C_8$ alkynyl, $C_7$–$C_{12}$ aralkyl which is unsubstituted or substituted in the alkyl moiety by hydroxyl, or $C_1$–$C_8$ alkanoyl or $C_3$–$C_5$ alkenoyl;

R[2], R[3], R[4] and R[5] independently represent hydrogen, $C_1$–$C_{24}$ alkyl, $C_1$–$C_{12}$ hydroxyalkyl, $C_1$–$C_{12}$ haloalkyl, $C_1$–$C_{12}$ cyanoalkyl, $C_2$–$C_{12}$ aminoalkyl or iminoalkyl, $C_3$–$C_{18}$ ether groups, $C_4$–$C_{18}$ hydroxyalkyl ether or cyanoalkyl ether groups, $C_7$–$C_{14}$ alkenyl or aralkyl, $C_2$–$C_7$ alkylene, and optionally containing a phosphite, ester or hindered phenol groups, and which in combination, one with another, represent $C_5$–$C_{14}$ cycloalkyl at least four of which C atoms are cyclized, and, optionally containing a keto, ester, amide, ether, thio or hydroxy group; but, only one of $R^2$ and $R^3$, and only one of $R^4$ and $R^5$ may be hydrogen; and, $R^6$ represents a free valency through which the PSP moiety is connected to the remaining structure of the stabilizer;

said hindered amine stabilizer being selected from the group consisting of (i) a bis-compound consisting of a $C_2$–$C_{12}$ alkylene connecting two PSP moieties, and (ii) a polyalkylene polyamine having a pendant triazine ring with a PSP substituent;

said shaped article having been subjected to a dose of gamma-radiation.

8. The shaped article of claim 7 wherein said hindered amine stabilizer is a polyalkylene polyamine having pendant triazine rings with PSP substituents on each of the rings.

9. The shaped article of claim 7 wherein the total dosage of said gamma-radiation is in the range from about 0.5 to 5.0 Mrad accumulated over a period of from about 1 minute to about 12 hours.

* * * * *